Oct. 9, 1945. H. A. JACKSON 2,386,398
ELECTRODE HOLDER
Filed Feb. 4, 1944
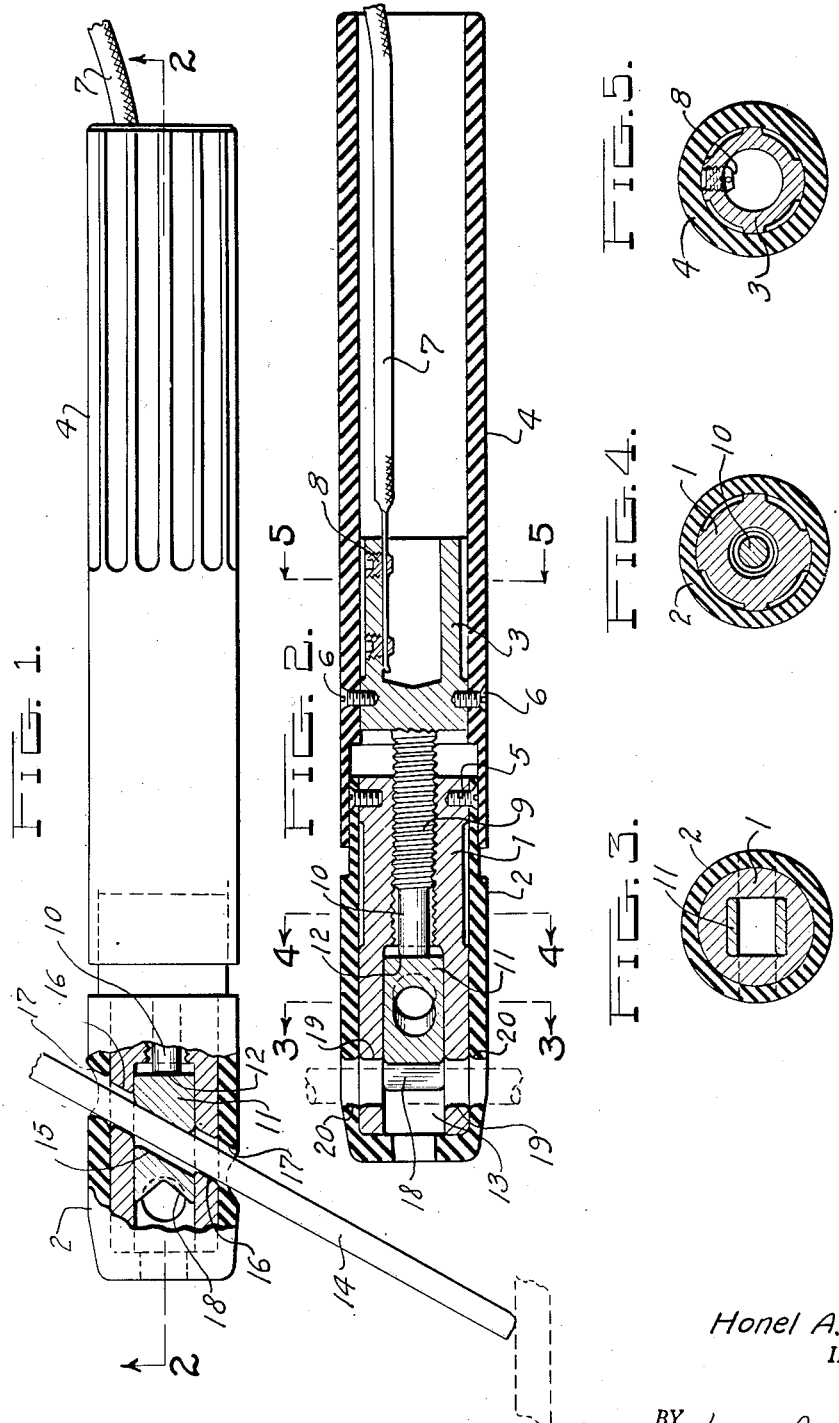
Honel A. Jackson
INVENTOR.
BY Barnes, Kisselle, Laughlin & Raisch
Attorneys Patented Oct. 9, 1945

2,386,398

UNITED STATES PATENT OFFICE 2,386,398

ELECTRODE HOLDER

Honel A. Jackson, Detroit, Mich.

Application February 4, 1944, Serial No. 521,006

1 Claim. (Cl. 219—8)

This invention relates to an electrode holder and more particularly to a holder for arc welding electrodes or weld rods.

It is the object of this invention to produce an electrode holder which is compact and efficient in operation.

The invention also contemplates a locking arrangement for easily installing the electrode in the holder and removing the same therefrom.

Fig. 1 is an elevation partly in section showing an electrode holder with the weld rod in one position.

Fig. 2 is a longitudinal section of the holder showing the weld rod in another optional position in the holder.

Figs. 3, 4 and 5 are sections along the lines 3—3, 4—4, and 5—5 of Fig. 2.

Referring more particularly to the drawing it will be seen that the holder comprises a head 1, an insulating cover 2 therefor, a shank 3, and a handle 4. The head 1 and shank 3 are made from any suitable high electrically conducting metal or alloy, such as copper or aluminum or their alloys.

Cover 2 and handle 4 are made from any suitable electrically insulating material having low heat conductivity characteristics, such as Bakelite, mineral or other fibre, or ceramic material.

Cover 2 is arranged to be slid over head 1 and retained in place by screws 5. Handle 4 is arranged to be slid over and retained on shank 3 by screws 6. Current is carried to shank 3 by cable 7 which is connected to the shank by screws 8. Shank 3 has a threaded reduced portion 9 which has a screw fit in threaded bore 10 in head 1. The reduced part 9 of shank 3 acts as a plunger, the outer end of which contacts locking block 11 as at 12. Locking block 11 has a rectangular cross-section and is mounted in cavity 13 in the end of head 1. Cavity 13 likewise has a rectangular cross-section to prevent rotation of block 11 in head 1.

The holder is arranged to hold the weld rod or electrode 14 in two positions, one at an acute angle to the longitudinal axis of the holder, Fig. 1, and in the other at right angles to the longitudinal axis of the holder, Fig. 2. For the first position the block 11 is provided with an oblique opening 15 and head 1 and insulation 2 with corresponding oblique openings 16 and 17, respectively. For the second position the outer end of block 11 is provided with a V slot 18 extending generally perpendicular to the longitudinal axis of the holder and the head and cover are provided with cooperating openings 19 and 20, respectively.

The electrode 14 is assembled in the holder by inserting one end of the electrode in either opening 15, Fig. 1, or openings 19, 20, Fig. 2, and the shank 9 is then screwed into the head 1 by giving the handle a half a turn or more, whereupon the weld rod is clamped between the openings in the head and the clamping block 11 either in the V groove 18 or against the right hand side of oblique opening 15. To remove the electrode from the holder the handle is given a half or more turn in the opposite direction thereby withdrawing end 12 of plunger 9 from the clamping block 11 which permits the weld rod to drop out or be withdrawn from the holder.

I claim:

A holder for an arc-welding electrode comprising a head having a longitudinal opening therein, one portion of said opening being threaded and another portion of polygonal cross section, a threaded handle shank having a screw fit in the threaded portion of said bore and having an end adapted to project into the other portion of said bore, a slidable block in the polygonal portion of said bore arranged to abut the handle and be moved outwardly of the polygonal portion of the longitudinal bore when the handle shank is turned in said head, said locking block having a V groove in its outer end and also an oblique opening therethrough, opposed openings in said head communicating with said longitudinal opening adjacent said V groove and arranged to cooperate therewith, obliquely opposed openings in said head communicating with said longitudinal bore adjacent said oblique opening and arranged to cooperate therewith whereby an electrode can be optionally locked in said V groove and the first set of openings or in said oblique opening and the set of obliquely opposed openings upon turning said handle shank in said head to move the locking block outwardly.

HONEL A. JACKSON.